UNITED STATES PATENT OFFICE.

FRANK AUSTIN LIDBURY, OF NIAGARA FALLS, NEW YORK.

PRODUCTION OF OXALIC ACID.

1,031,074.  Specification of Letters Patent.  Patented July 2, 1912.

No Drawing.  Application filed November 22, 1911. Serial No. 661,692.

*To all whom it may concern:*

Be it known that I, FRANK AUSTIN LIDBURY, a citizen of Great Britain, and a resident of Niagara Falls, Niagara county, New York, (whose post-office address is 33 Sugar street, Niagara Falls, New York), have invented a new and useful Improvement in the Production of Oxalic Acid, which invention is fully set forth in the following specification.

This invention relates to the commercial manufacture of oxalic acid on a large scale, in a simple and direct manner, yet economically and effectively.

The invention consists broadly of the generation of oxalic acid by the treatment of certain salts thereof with hydrochloric acid, under suitable conditions, followed by the subsequent recovery of the resultant oxalic acid.

Heretofore, in the manufacture of oxalic acid ($H_2C_2O_4$), a first step consists of producing (as an intermediate body) sodium oxalate or potassium oxalate, or various mixtures of the two, by the reaction of sodium (or potassium) hydrate upon various materials (such, for instance, as sawdust or the like); followed, as a second step, by the conversion of the oxalate or oxalates into calcium oxalate (a second intermediate product), by boiling with lime; then, as the third step, the calcium oxalate is converted into oxalic acid, by heating with sulfuric acid; finally, as the fourth step, the oxalic acid has to be recovered from the mother liquor by evaporation and crystallization. This process has numerous disadvantages, among which are the following: sulfuric acid and lime are required, the whole of these two materials is decomposed and used up, so that fresh supplies are constantly needed; these two ingredients go to make up calcium sulfate, a worthless waste-product that has to be disposed of (which, in commercial operation, involves considerable expenditure); after the production of the oxalate, there are two successive chemical treatments necessary; and the evaporation of the mother liquor (containing as it does some calcium sulfate), to recover the oxalic acid, is not easy to carry out.

My invention dispenses with the sulfuric acid and the lime; it requires only one chemical treatment after the production of the intermediate oxalate; it does not require evaporation; and it produces no waste-product.

My invention is based upon the fact that the reaction of hydrochloric acid upon certain salts of oxalic acid (to wit: the sodium salts) gives oxalic acid and the chlorid; and that such chlorid is practically insoluble in strong hydrochloric-acid solutions, while the oxalic acid goes into solution; and (in the preferred form of my invention) upon the further fact that on reducing the temperature of such solutions having substantial amounts of oxalic acid dissolved therein, a considerable portion of the latter body is precipitated. I take advantage of these facts by reacting upon a sodium salt of oxalic acid with hydrochloric acid, in the presence of water and heat, and thereby produce on the one hand oxalic acid which remains in solution, and on the other hand the solid sodium chlorid which can be separated readily from the mother liquor containing the oxalic acid, and then, on lowering the temperature of the mother liquor, oxalic acid is precipitated and recovered in solid form. My invention, however, is not limited to the use of heat and subsequent cooling, because the solid oxalic acid can be recovered from the mother liquor by other means, such as evaporation and subsequent crystallization.

My invention, then, consists broadly of treating a salt or salts of oxalic acid, particularly the sodium salts (sodium oxalate and sodium hydrogen oxalate), with hydrochloric acid in such manner as to generate sodium chlorid in solid form and oxalic acid in solution, and in then recovering the oxalic acid by any suitable means.

My invention consists further in the various steps and procedures hereinafter set forth and claimed.

The reaction of hydrochloric acid (HCl) upon sodium oxalate ($Na_2C_2O_4$) in the presence of water ($H_2O$), to produce sodium chlorid (NaCl) and oxalic acid ($H_2C_2O_4$), may be expressed by the following equation:

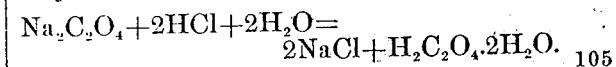

$$Na_2C_2O_4 + 2HCl + 2H_2O = 2NaCl + H_2C_2O_4.2H_2O.$$

If sodium oxalate be treated with a concentrated aqueous solution of hydrochloric acid, especially at normal temperature, there are ordinarily formed certain practically insoluble bodies and certain bodies in solution, namely, (as solids) sodium chlorid and sodium hydrogen oxalate, and (in solution) oxalic acid with small quantities of soluble sodium salts. I have found, however, that this sodium hydrogen oxalate ($NaHC_2O_4$) may be itself converted, by similar treatment with hydrochloric acid, into (solid) sodium chlorid and (soluble) oxalic acid, as expressed by the formula:

$$NaHC_2O_4 + HCl + 2H_2O = NaCl + H_2C_2O_4 \cdot 2H_2O.$$

Moreover, I have found further that if sodium oxalate or sodium hydrogen oxalate, or mixtures of the two bodies, be treated with a large excess of the concentrated hydrochloric acid solution, particularly if the strength of the solution be maintained throughout at high value (as by passing in hydrochloric acid gas), then I am able to decompose not only the sodium oxalate, but also the sodium hydrogen oxalate (whether the latter be taken as a raw material or as an intermediate product from the reaction upon sodium oxalate), both bodies being converted into the insoluble sodium chlorid and the soluble oxalic acid. So that, as a general proposition, the greater the amount of the hydrochloric acid solution used per unit of the oxalate, and the greater the strength of the acid solution (especially when maintained to the conclusion of the operation, by passing in hydrochloric acid gas), the more complete the reaction in producing sodium chlorid and oxalic acid, and the greater the yield of oxalic acid, and the smaller the amount of sodium salts that goes into solution. In other words, by employing a relatively large quantity of the acid solution, and maintaining the concentration thereof (as by passing in the gas), the more perfectly is my invention realized; nevertheless, my invention is carried out, but not so effectively, with relatively smaller amounts of the acid solution, and with weaker solutions.

As a specific instance or formula, I take one part by weight of sodium oxalate, and put it into a solution consisting of about four parts by weight of water saturated with hydrochloric acid gas (and kept practically saturated throughout the treatment), at a temperature of, say, about 70° centigrade, and allow the reaction to continue until the sodium oxalate has been completely disposed of, this being hastened by agitation. Sodium chlorid is thereby produced in solid form and is removed, as by decanting off the yet-uncooled mother liquor, and any oxalic acid adhering to the chlorid may be removed by washing the latter (preferably with concentrated hydrochloric acid solution). If the mother liquor has been kept practically saturated with hydrochloric acid gas, it will now contain, in solution, 200 grams or more per liter of oxalic acid, as well as a very small quantity of sodium salts. This liquor is now allowed to cool, which may be hastened by artificial means, whereupon a considerable portion of the oxalic acid crystallizes out and is precipitated, and may be separated from the mother liquor, as by decanting the latter. If desired, the oxalic acid crystals may be further purified, as by re-crystallization from water (preferably containing hydrochloric acid). This mother liquor, still containing a considerable amount of oxalic acid, is now available to receive a fresh supply of sodium oxalate (preferably with further hydrochloric acid gas), or a fresh quantity of hydrochloric acid gas alone, for repeating the operation and recovering a further yield of oxalic acid in solid form. Briefly, I take sodium oxalate and an aqueous solution of hydrochloric acid, and obtain separate yields of sodium chlorid and oxalic acid respectively, with the remaining mother liquor ready for repeating the process. The resultant sodium chlorid may be converted, by well-known electrolytic and chemical methods, into caustic soda and hydrochloric acid in equivalent quantities,—the former available for the preparation of further sodium oxalate as raw material, and the latter for decomposing said sodium oxalate, to produce fresh yields of sodium chlorid and oxalic acid; and so on, *ad infinitum*, as a cyclic commercial process.

While the foregoing is a preferred formula, yet it may be varied considerably as to proportions, temperature, and treatment, without departing from the spirit of my invention. For instance, for a given quantity of sodium oxalate, a larger or smaller quantity of the hydrochloric solution may be employed than that indicated (four to one), and the strength of the solution (whether of greater or of less volume) may vary considerably below complete saturation with the gas; but, in general, the stronger the solution, (especially if its strength be maintained to the close of the treatment) and the greater its relative amount, the better the result; and where the introduction of hydrochloric acid in the form of gas is directed, it may be applied in the form of an already-prepared aqueous solution or in both forms. The temperature also may vary within a wide range, since the purpose of using elevated temperature is to be ab' to lower it and thereby precipitate oxal. acid; for instance, if the treatment shoulc be carried out at normal temperature, th- precipitation could be effected by artificially cooling the mother liquor below normal; although, as already stated, oxalic acid can be otherwise recovered by well-known means. But, I prefer the formula above set forth, substantially four parts of solution kept completely saturated (or nearly saturated) with the gas, to one part of the oxalate, and a temperature of around 70° centigrade.

Although I have described the preferred form of my process as comprising as the first step the hydrochloric-acid treatment, followed by the removal of the sodium chlorid and thereafter by the recovery of solid oxalic acid from the mother liquor, yet my invention is not limited to this order of steps, inasmuch as hydrochloric acid may be further applied at later stages of the operation. For instance, after the original treatment with hydrochloric acid and after the removal of the sodium chlorid from the solution, as above set forth, but before recovery of any oxalic acid, further hydrochloric acid gas may be run into the (uncooled) mother liquor (with or without fresh quantities of sodium oxalate), and the resultant sodium chlorid removed and further oxalic acid then recovered, as before; and this may be repeated upon the same mother liquor as often as found desirable; or the mother liquor may first be cooled and some oxalic acid thereby recovered, and thereafter the gas run in, followed by removal of the chlorid and recovery of further oxalic acid. In short, the saturation of the mother liquor (with the gas) need not be during the first stage (the original hydrochloric reaction), but may be effected at later stages of the operation.

I have referred broadly to sodium salts of oxalic acid, but for commercial reasons I prefer sodium oxalate ($Na_2C_2O_4$) as the body to be treated with hydrochloric acid. However, sodium hydrogen oxalate ($NaHC_2O_4$) may be substituted, without change of quantities, conditions, etc.; so that where I speak of "sodium oxalate," sodium hydrogen oxalate also is included. And, in general, any salt of oxalic acid may be employed that, when treated with an excess of strongly-concentrated aqueous solution of hydrochloric acid, will yield an insoluble chlorid and oxalic acid in solution but recoverable therefrom.

Having thus described my invention, I claim:

1. The herein-described cyclic process of manufacturing oxalic-acid, which consists in treating sodium-oxalate with hydrochloric-acid in the presence of water to produce solid sodium-chlorid and oxalic-acid in solution, recovering oxalic-acid from the mother-liquor, producing from the sodium-chlorid caustic-soda and a fresh supply of hydrochloric-acid respectively, employing said caustic-soda for preparing further sodium-oxalate, and treating said fresh supply of sodium-oxalate with said fresh supply of hydrochloric-acid in said mother-liquor, and recovering further yields of oxalic-acid therefrom as above.

2. The process of manufacturing oxalic-acid, which consists in treating sodium-oxalate with hydrochloric-acid in the presence of water to produce solid sodium-chlorid and oxalic-acid in solution, then separating said chlorid from the solution, recovering oxalic-acid from the mother-liquor, and then adding fresh quantities of sodium-oxalate and hydrochloric-acid to said mother-liquor to produce a further yield of oxalic-acid.

3. The process of producing oxalic-acid, which consists in first producing sodium-chlorid in solid form and oxalic-acid in solution by treatment of sodium-oxalate with an excess of concentrated hydrochloric-acid solution, then separating the solid chlorid from the mother-liquor, and recovering oxalic-acid from the latter in any suitable manner.

4. The process of producing oxalic-acid, which consists in first producing sodium-chlorid in solid form and oxalic-acid in solution by treating sodium-oxalate with an excess of concentrated hydrochloric-acid solution at an elevated temperature, then separating the solid chlorid from the mother-liquor, and recovering oxalic-acid from the latter by reduction of temperature.

5. The process of manufacturing oxalic-acid, which consists in treating sodium-oxalate with an excess of hydrochloric-acid solution at a temperature of about 70° centigrade, then drawing off the hot mother-liquor containing oxalic-acid in solution, and then lowering the temperature of said mother-liquor and thereby precipitating oxalic-acid, and finally drawing off the mother-liquor to leave the solid oxalic acid.

6. The process of producing oxalic-acid by treating sodium-oxalate with hydrochloric-acid in the presence of water and at an elevated temperature, then removing the resultant solid sodium-chlorid from the mother-liquor, and finally recovering oxalic-acid from the mother-liquor by cooling the latter.

7. The process of producing oxalic-acid, which consists in treating sodium-oxalate with hydrochloric-acid to produce sodium-chlorid in solid form and oxalic-acid in solution, then separating the solution from the solid sodium-chlorid, and finally recovering oxalic-acid from the solution in any suitable manner.

8. In the process of producing oxalic-acid, the step which consists in treating sodium-oxalate with an excess of concentrated hydrochloric-acid solution.

9. In the process of producing oxalic-acid, the step which consists in treating sodium-oxalate with concentrated hydrochloric-acid solution.

10. In the process of making oxalic-acid from a sodium-salt of the same, the step which consists in reacting on said salt with concentrated hydrochloric-acid in presence of water, and then separating the products formed.

11. In the process of making oxalic-acid from a sodium-salt of the same, the steps which consist in reacting on said salt with concentrated hydrochloric-acid solution while in heated condition, and then lowering the temperature to recover one of the resulting products.

12. The process of making oxalic-acid from a sodium-salt of the same, consisting in applying to said salt an aqueous hydrochloric-acid solution, passing hydrochloric acid-gas into said solution, removing the solid product, and lowering the temperature to precipitate oxalic-acid.

13. The process of producing oxalic-acid, by treating a sodium-salt thereof with hydrochloric-acid in such manner as to produce an insoluble chlorid and oxalic-acid in solution, and then recovering the oxalic-acid.

14. In the process of producing oxalic-acid, the step which consists in treating a sodium-salt thereof with concentrated hydrochloric-acid.

15. The process of making oxalic-acid from a salt of the same, consisting in reacting on said salt with an aqueous solution of hydrochloric-acid and thereby producing the chlorid in solid form and oxalic-acid in solution, and then recovering oxalic-acid from the mother-liquor.

In testimony whereof I have signed this specification in the presence of two subscribing witnesses.

FRANK AUSTIN LIDBURY.

Witnesses:
HELEN WINIFRED BEDFORD,
HAZEL IDA SHEAF.